US012340925B2

(12) United States Patent
Kimura

(10) Patent No.: US 12,340,925 B2
(45) Date of Patent: Jun. 24, 2025

(54) CHIP RESISTOR AND METHOD OF PRODUCING THEREOF

(71) Applicant: KOA CORPORATION, Ina (JP)

(72) Inventor: Taro Kimura, Ina (JP)

(73) Assignee: KOA CORPORATION, Ina (JP)

( * ) Notice: Subject to any disclaimer, the term of this patent is extended or adjusted under 35 U.S.C. 154(b) by 340 days.

(21) Appl. No.: 18/126,517

(22) Filed: Mar. 27, 2023

(65) Prior Publication Data

US 2023/0335317 A1 Oct. 19, 2023

(30) Foreign Application Priority Data

Apr. 15, 2022 (JP) ................................ 2022-067568

(51) Int. Cl.
*H01C 1/142* (2006.01)

(52) U.S. Cl.
CPC .................................. *H01C 1/142* (2013.01)

(58) Field of Classification Search
CPC ..................................................... H01C 1/142
See application file for complete search history.

(56) References Cited

U.S. PATENT DOCUMENTS 10,290,402 B2 * 5/2019 Yoneda ................ H01C 17/288
2017/0271053 A1 9/2017 Yoneda
2020/0066429 A1 * 2/2020 Imahashi ................ H01C 1/01

FOREIGN PATENT DOCUMENTS

JP WO2018/123422 A1 10/2019
WO WO-2021095535 * 5/2021 ............... H01C 1/14

OTHER PUBLICATIONS

WO-2021095535 translation (Year: 2021).*

* cited by examiner

*Primary Examiner* — Kyung S Lee
(74) *Attorney, Agent, or Firm* — Oliff PLC

(57) ABSTRACT

A chip resistor 10 comprises: a insulating substrate 1; a pair of upper surface electrodes 2; a resistor 3; a pair of lower surface electrodes 5; a pair of resin electrode layers 6 made of synthetic resin materials containing conductive particles and laminated on the pair of lower surface electrodes 5; a pair of end face electrodes 7; and a pair of external electrodes 8, wherein the pair of the lower surface electrodes 5 is made of metal thin film layers formed as thin films on a mounting surface of the insulating substrate 1, respectively, and includes exposed portions 5*a* exposed from the resin electrode layers 6, respectively, and the pair of external electrodes 8 is in contact with the exposed portions 5*a* of the lower surface electrodes 5 and entire surfaces of the resin electrode layers 6, respectively.

6 Claims, 8 Drawing Sheets

【図8】

CHIP RESISTOR AND METHOD OF PRODUCING THEREOF

TECHNICAL FIELD

The present invention relates to a surface mount chip resistor to be soldered on lands of a circuit board, and a method of producing thereof.

BACKGROUND ART

The chip resistor generally includes a rectangular parallelepiped insulating substrate, a pair of upper surface electrodes provided at both ends, respectively, in the longitudinal direction on the upper surface of the insulating substrate, a resistor provided so as to extend across the pair of upper surface electrodes, an insulating protective film for covering the resistor, a pair of lower surface electrodes provided at both ends, respectively, in the longitudinal direction on the lower surface of the insulating substrate, a pair of end face electrodes for electrically connecting the upper surface electrodes and the lower surface electrodes, external electrodes formed of plating materials and covering the end face electrodes, and the like. The chip resistor having the structure as described above is placed on the lands provided on the circuit board with the lower surface electrodes facing downward, and is surface-mounted by soldering the lands provided on the circuit board and the external electrodes provided on the chip resistor.

In the state where the chip resistor is surface-mounted as described above, when the thermal environment repeatedly changes (hereinafter, referred to as "thermal shock"), the difference between the coefficient of thermal expansion of the circuit board and that of the insulating substrate of the chip resistor causes thermal stress, and this thermal stress acting on a solder joint portion may cause cracks to form. In particular, the thermal stress caused by the difference in the coefficients of thermal expansion between the circuit board and the insulating substrate increases as the size of the substrate of the chip resistor increases, which increases the possibility of formation of the cracks in the solder joint portion. This disadvantageously reduces the thermal shock resistance.

Patent Literature 1 discloses a chip resistor in which the lower surface electrodes provided on the mounting surface (back surface) of the insulating substrate are formed to have a double layer structure including a stress relaxation layer made of a synthetic resin material formed on the insulating substrate by screen-printing and a metal thin film layer formed on the stress relaxation layer by sputtering. In the chip resistor having the structure as described above, the stress relaxation layer relaxes the thermal stress acting on a solder joint portion even upon exposure of the chip resistor to the thermal shock during surface-mounting on the circuit board, and therefore, the thermal shock resistance can be secured.

CITATION LIST

Patent Literature

Patent Literature 1: WO-2018-123422

SUMMARY OF INVENTION

Technical Problem

However, in the chip resistor according to Patent Literature 1, the metal thin film layer is formed on the surface of the stress relaxation layer made of a synthetic resin material, which reduces the strength of adhesion at the interface therebetween. This may cause a risk that the metal thin film layer peels off from the stress relaxation layer due to the internal stress of the plating material in the process of forming the external electrodes by electroplating. Furthermore, the most of the stress relaxation layer formed on the back surface of the insulating substrate is covered with the metal thin film layer, which also causes a problem that the metal thin film layer hinders the effect of relaxation of the thermal stress by the stress relaxation layer.

The present invention has been made in view of the circumstances of the prior art described above, and an object of the present invention is to provide a chip resistor having high thermal shock resistance and a method of producing thereof.

Solution to Problem

In order to achieve the object above, the present invention provides a chip resistor comprising: a rectangular parallelepiped insulating substrate that includes a component surface and a mounting surface located on mutually opposite sides in a thickness direction; a pair of upper surface electrodes that is provided at both ends, respectively, in a longitudinal direction on the component surface of the insulating substrate; a resistor that bridges between the pair of upper surface electrodes; a pair of lower surface electrodes that is provided at both ends, respectively, in the longitudinal direction on the mounting surface of the insulating substrate; a pair of resin electrode layers that is laminated on the pair of lower surface electrodes, respectively, each of the pair of resin electrode layers being made of a synthetic resin material containing conductive particles; a pair of end face electrodes that electrically connects the pair of upper surface electrodes and the pair of lower surface electrodes; and a pair of external electrodes that covers at least the pair of end face electrodes, each of the pair of external electrodes being made of a plating material, wherein the pair of lower surface electrodes is made of metal thin film layers formed as thin films on the mounting surface of the insulating substrate, respectively, and includes exposed portions exposed from the pair of resin electrode layers, respectively, and the pair of external electrodes is in contact with the exposed portions of the pair of lower surface electrodes and entire surfaces of the pair of resin electrode layers, respectively.

In the chip resistor having the structure described above, the lower surface electrodes made of metal thin film layers having the low electrical resistivity have been formed on the mounting surface of the insulating substrate and also the resin electrode layers having the electrical resistivity higher than that of the metal thin film layers have been formed with portions of the lower surface electrodes being exposed, and this stabilizes the current flowing through the resin electrode layers in the process of forming the external electrodes by electroplating and thus makes the thickness of the plating films uniform. In this process, the current can flow uniformly over the entire surfaces of the resin electrode layers due to the laminate structure in which the resin electrode layers partially overlap the portions of the lower surface electrodes instead of connecting the lower surface electrodes made of metal thin film layers only to the outer peripheries of the resin electrode layers. Furthermore, the plating layers are formed starting from the exposed portions of the lower surface electrodes having the low electrical resistivity toward the resin electrode layers having the high electrical resistivity, which can prevent the plating layers formed on the resin electrode layers from peeling off.

Thus, even when the strength of adhesion at the interfaces between the lower surface electrodes formed of the metal thin film layers and the resin electrode layers formed of the synthetic resin materials is low, due to the sandwich structure of the resin electrode layers sandwiched between the metal thin film layers and the plating materials (external electrodes), the resin electrode layers can be prevented from peeling off even in the chip resistor after being finished, and the thermal stress caused by the thermal shock can be relaxed. Furthermore, the metal thin film layers having the high thermal conductivity are directly in contact with the insulating substrate, which causes, in the chip resistor mounted on the circuit board, the heat generated in the resistor to be radiated from the insulating substrate to the circuit board side through the metal thin film layers and the solder joint portions. This can realize a chip resistor excellent in heat dissipation.

In the structure above, it is sufficient that at least portions of the lower surface electrodes are exposed without being covered with the resin electrode layers as the exposed portions. Furthermore, when forming each of the exposed portions of the lower surface electrodes into a channel shape (C-shape) so as to surround an outer periphery of each of the resin electrode layers, the exposed portions of the lower surface electrodes which are exposed from the resin electrode layers increases. This results in great improvement in heat dissipation and allows the plating layers to be formed stably.

In the structure above, when each of the pair of resin electrode layers is provided with a cutout portion that opens toward an end face of the insulating substrate, and each of the exposed portions of the pair of lower surface electrodes is formed on an outer peripheral side of each of the resin electrode layers and in the cutout portion, respectively, not only the plating layers can formed more stably, but also the breaking for dividing the large-sized substrate along the primary division grooves into strip-shaped substrates is enhanced.

In the structure above, when each of the resin electrode layers is formed at an inner position away from an end face of the insulating substrate, and each of the exposed portions of the pair of lower surface electrodes is formed into a frame shape so as to surround an entire periphery of each of the resin electrode layers, the exposed portions of the lower surface electrodes which are exposed from the resin electrode layers increase. This allows the plating layers to be formed stably.

In the structure above, the end face electrodes may be thick layers formed of conducting resin provided, for example, by coating on the ends of the insulating substrate. On the other hand, it is preferable that each of the end face electrodes is formed of a metal thin film by sputtering metal particles toward the end face of the insulating substrate, and the metal thin film covers at least a portion of each of the exposed portions of the pair of lower surface electrodes.

Furthermore, in order to achieve the object described above, the present invention provides a method of producing a chip resistor, comprising the steps of: forming, on a component surface of an insulating substrate, a resistor and upper surface electrodes connected to both ends of the resistor, respectively; forming, in a central portion of a mounting surface located on an opposite side of the component surface of the insulating substrate, a mask made of a soluble material; forming, on the mounting surface exposed from the mask, lower surface electrodes by sputtering metal particles, respectively; after removing the mask, forming resin electrode layers by printing synthetic resin materials containing conductive particles on the lower surface electrodes with portions of the lower surface electrodes being exposed, respectively; forming end face electrodes that electrically connect between the upper surface electrodes and the lower surface electrodes by sputtering metal particles on end faces of the insulating substrate, respectively; and forming external electrodes that cover the end face electrodes, the exposed portions of the lower surface electrodes, and entire surfaces of the resin electrode layers by electroplating after forming the end face electrodes, respectively.

According to the method of producing a chip resistor comprising the steps described above, the procedures of forming the lower surface electrodes by sputtering with the mask being formed on the mounting surface of the insulating substrate, and then after removing the mask using ultrasonic cleaning, forming the resin electrode layers on the lower surface electrodes are carried out. In the method above, the ultrasonic cleaning necessary for removing the mask does not adversely affect the resin electrode layers and thus the chip resistor having high thermal shock resistance can be easily produced.

Advantageous Effects of Invention

According to the present invention, it is possible to provide a chip resistor having high thermal shock resistance, and also provide a method of producing thereof.

Each of FIG. 3A~3E is a cross-sectional view illustrating production processes of the chip resistor.

Each of FIG. 4F~4J is a cross-sectional view illustrating the production processes of the chip resistor.

Figure 5:
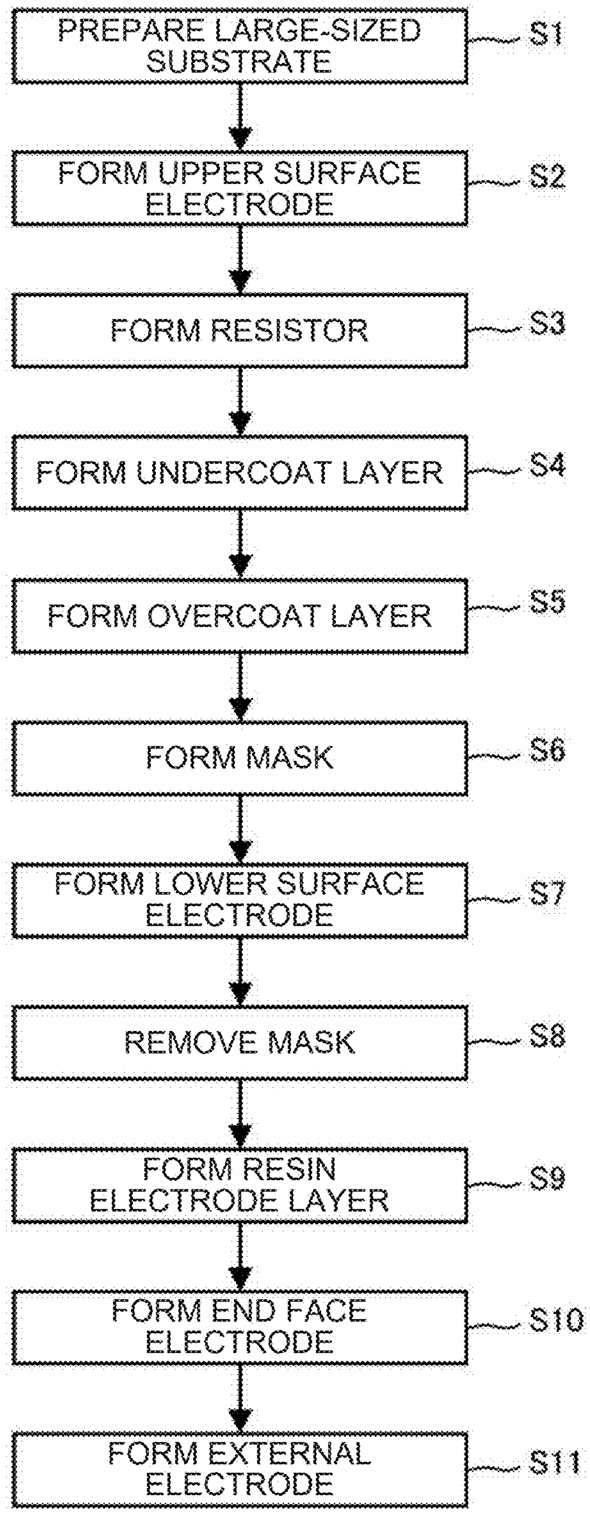

FIG. 5 illustrates a flowchart of the production processes of the chip resistor.

Figure 6:
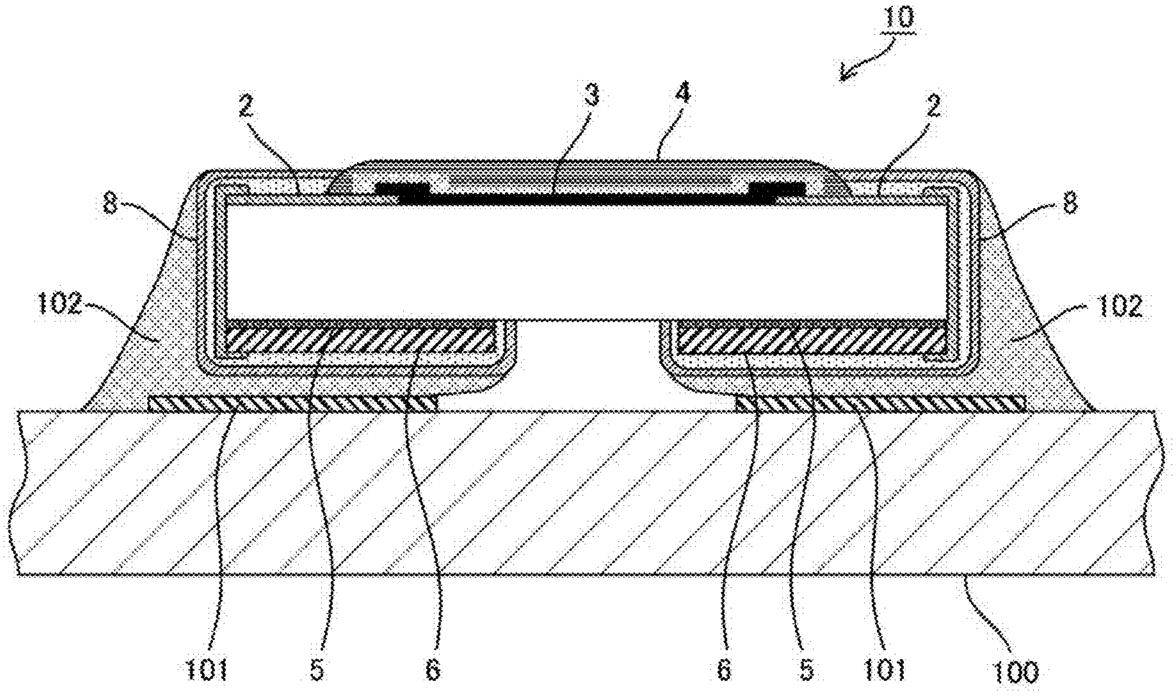

FIG. 6 is a cross-sectional view illustrating the chip resistor being mounted.

Figure 7:
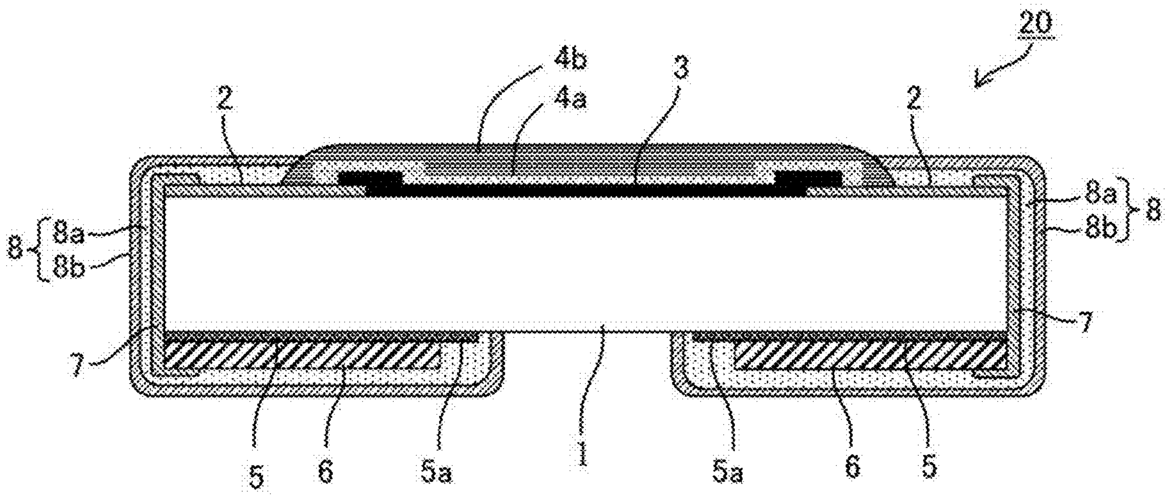

FIG. 7 is a cross-sectional view of a chip resistor according to a second embodiment.

Figure 8:
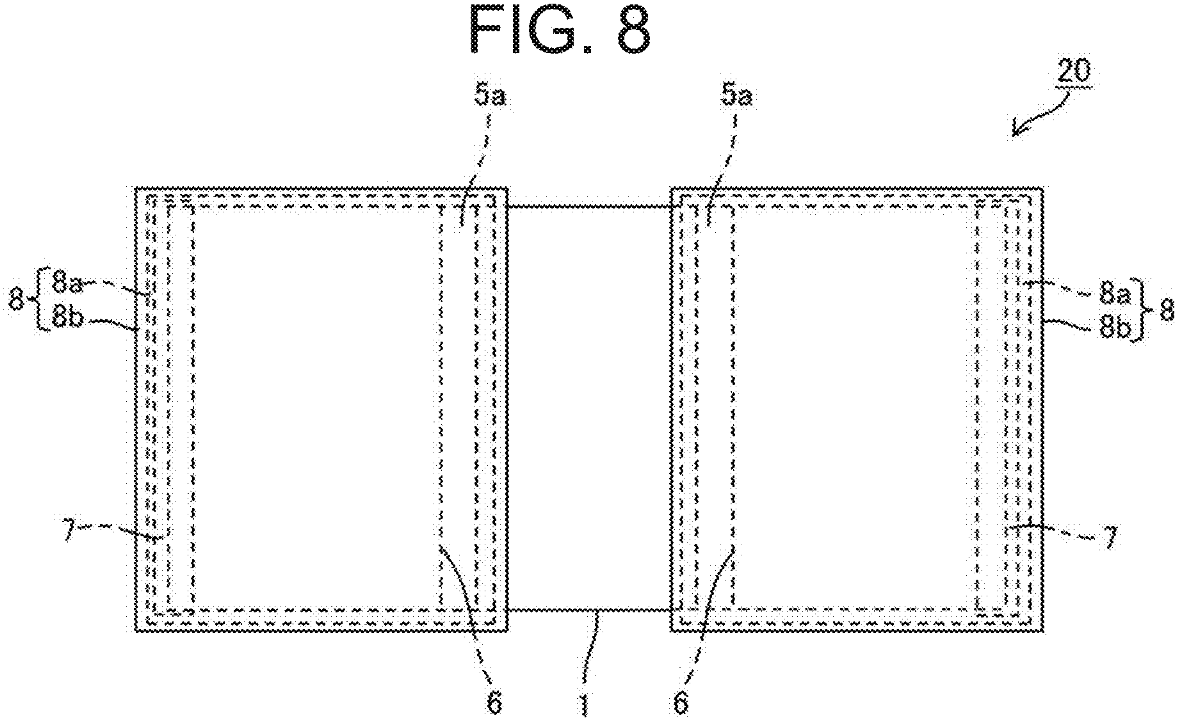

FIG. 8 is a rear view of the chip resistor according to the second embodiment.

Figure 9:
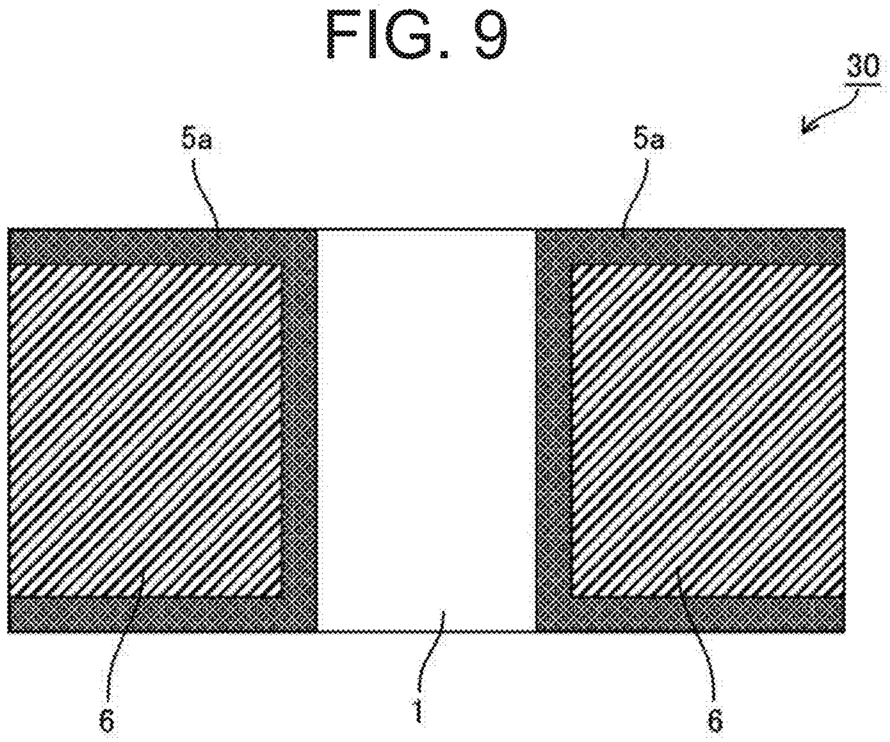

FIG. 9 is a rear view of a chip resistor according to a third embodiment.

Figure 10:
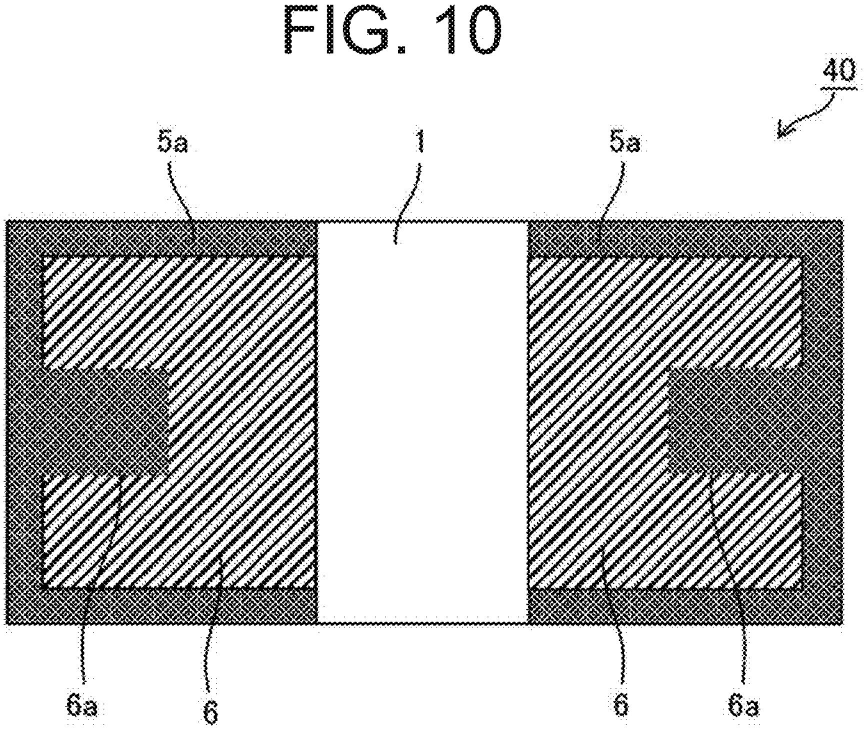

FIG. 10 is a rear view of a chip resistor according to a fourth embodiment.

Figure 11:
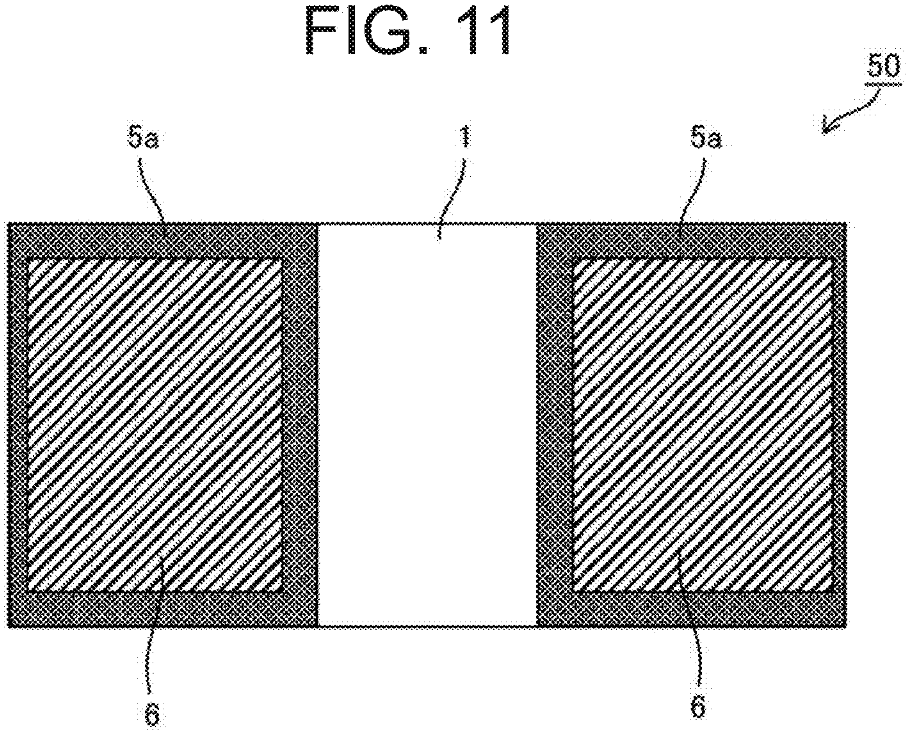

FIG. 11 is a rear view of a chip resistor according to a fifth embodiment.

DESCRIPTION OF EMBODIMENTS

Hereinafter, embodiments of the present invention will be described with reference to the drawings.

Figure 1:
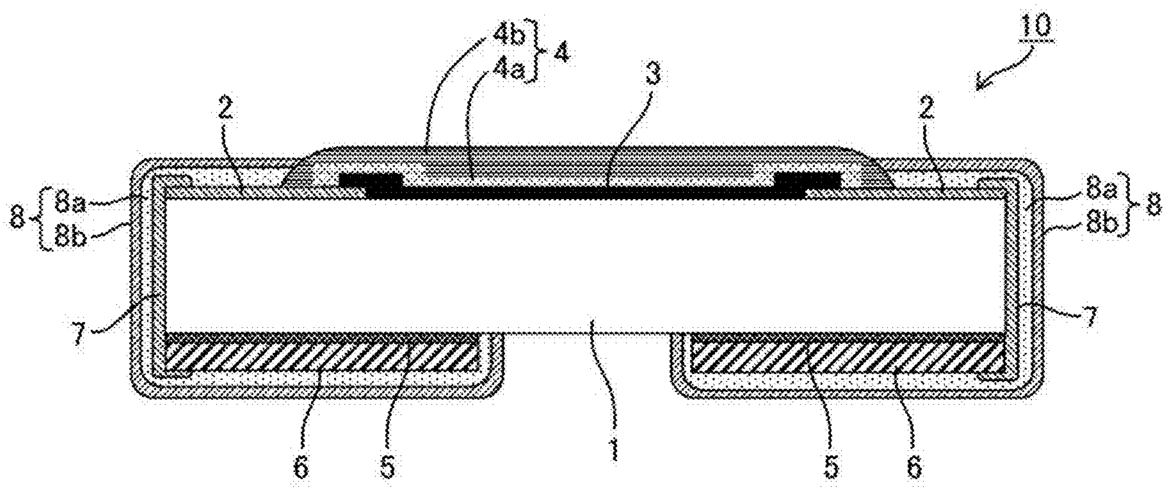
FIG. 1 is a cross-sectional view of a chip resistor according to a first embodiment.
Figure 2:
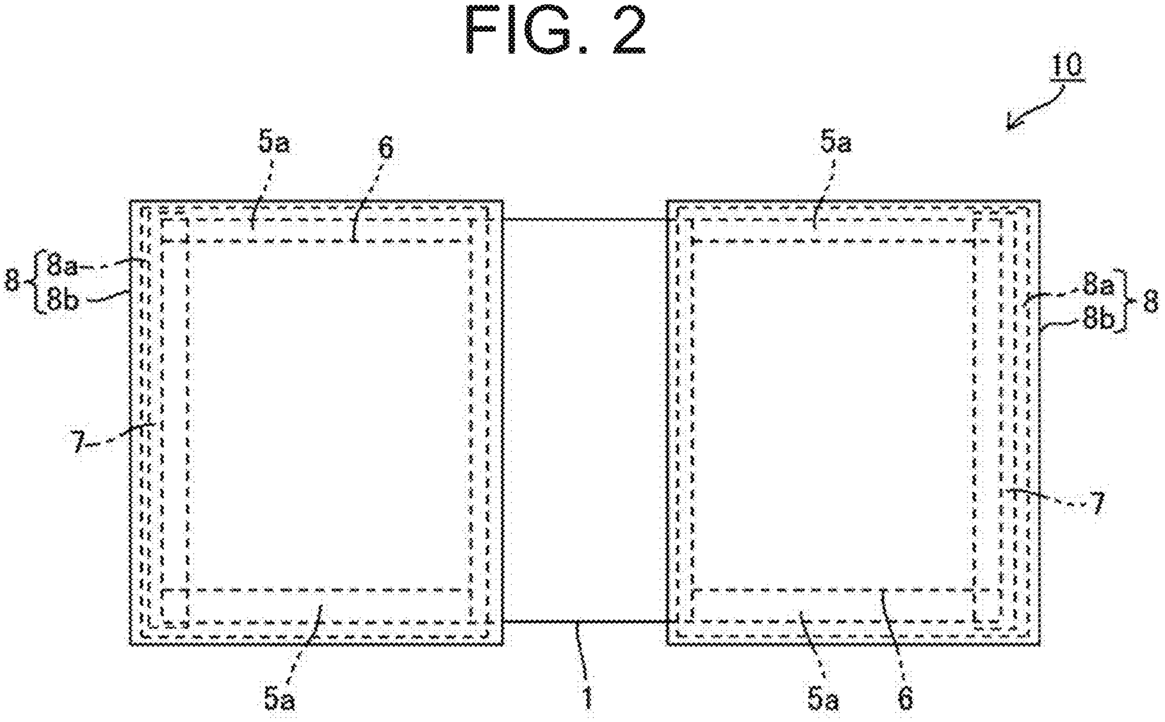
FIG. 2 is a rear view of the chip resistor according to the first embodiment.
Figure 3A:
Figure 3B:
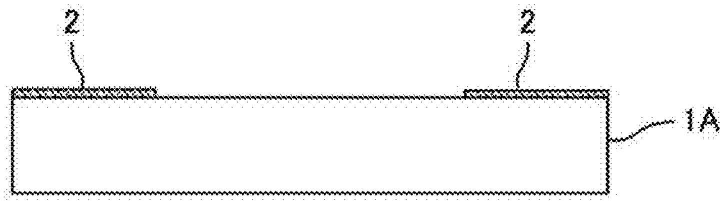
Figure 3C:
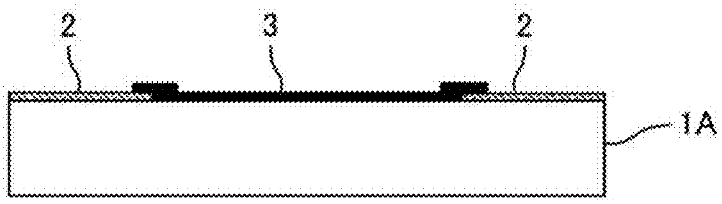
Figure 3D:
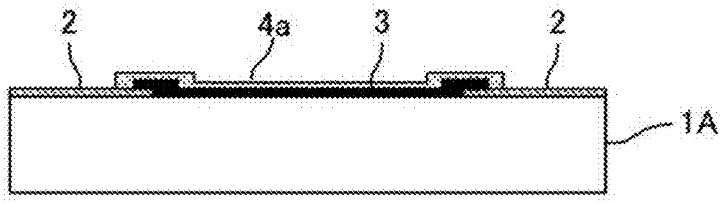
Figure 3E:
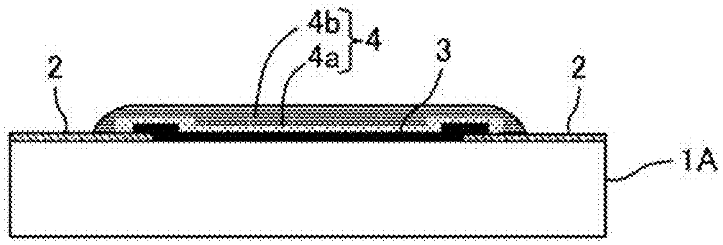
Figure 4F:
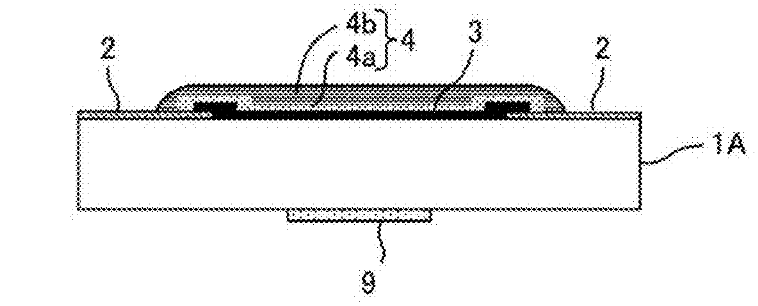
Figure 4G:
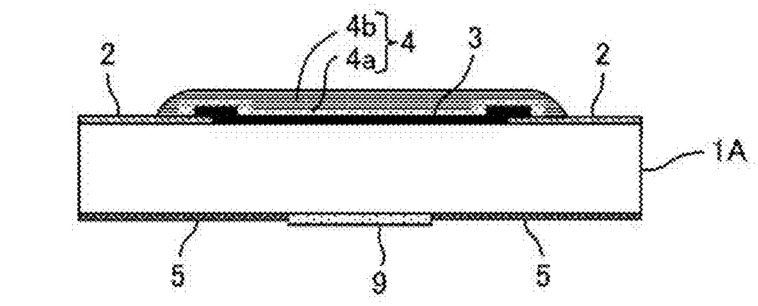
Figure 4H:
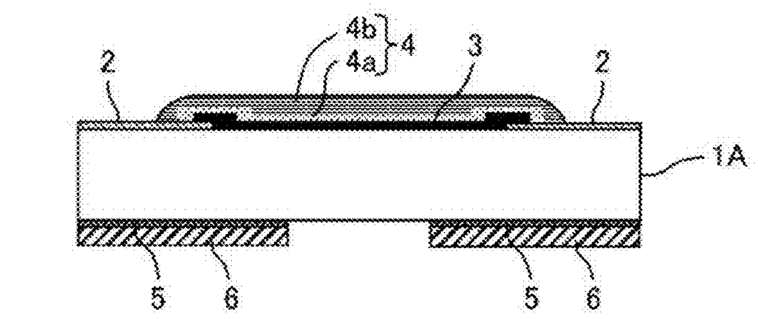
Figure 4I:
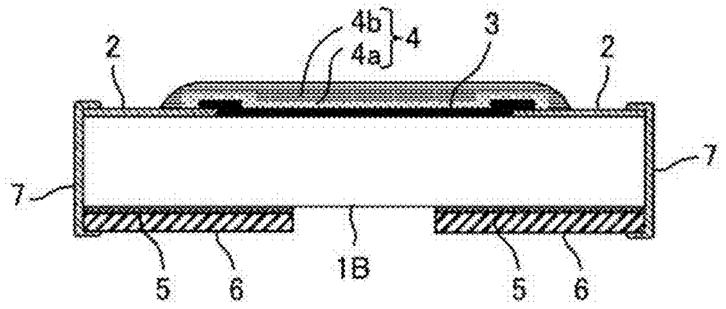
Figure 4J:
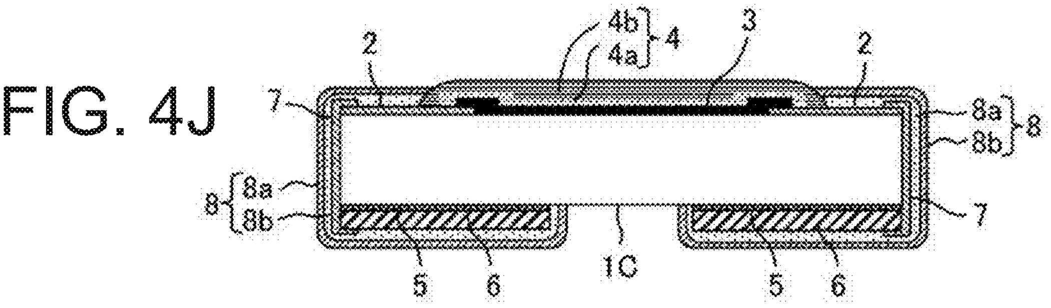

FIG. 1 is a cross-sectional view of a chip resistor 10 according to a first embodiment, and FIG. 2 is a rear view of the chip resistor 10 according to the first embodiment.

As illustrated in FIG. 1 and FIG. 2, the chip resistor 10 according to the first embodiment includes a rectangular parallelepiped insulating substrate 1 having a component surface and a mounting surface, which are located on mutually opposite sides in the thickness direction, a pair of upper surface electrodes 2 formed at both ends, respectively, in the longitudinal direction on the component surface (upper surface in FIG. 1) of the insulating substrate 1, a resistor 3 that bridges between the pair of upper surface electrodes 2, a protective layer 4 that has a double layer structure and covers the resistor 3, a pair of lower surface electrodes 5 formed at both ends, respectively, in the longitudinal direction on the mounting surface (lower surface in FIG. 1) of the insulating substrate 1, a pair of resin electrode layers 6 laminated on these lower surface electrodes 5, a pair of end face electrodes 7 that electrically connects the upper surface electrodes 2 and the lower surface electrodes 5, and a pair of external electrodes 8 that covers the end face electrodes 7.

For obtaining the insulating substrate 1, a large-sized substrate, which will be described later, is divided along divisions groove extending in a grid pattern into a plurality of substrates. The large-sized substrate from which the insulating substrate 1 is obtained is made of a ceramic substrate mainly composed of alumina ($Al_2O_3$).

The pair of upper surface electrodes 2 is obtained by screen-printing Ag—Pd paste on the upper surface of the large-sized substrate and then drying and sintering the paste.

The resistor 3 is obtained by screen-printing resistor paste, such as ruthenium oxide, on the upper surface of the large-sized substrate and then drying and sintering the paste. Both ends of the resistor 3 in the longitudinal direction overlap the pair of upper surface electrodes 2, respectively. Although not illustrated, a trimming groove for adjusting a resistance value is formed in the resistor 3.

The protective layer 4 includes an undercoat layer 4*a* for covering the resistor 3 and an overcoat layer 4*b* for covering the undercoat layer 4*a*. The undercoat 4*a* is obtained by screen-printing glass paste and then drying and sintering the paste. The overcoat layer 4*b* is obtained by screen-printing resin paste, such as epoxy resin or phenolic resin, and then heating and curing (baking) the paste. Note that the undercoat layer 4*a* is provided before the trimming groove is formed in the resistor 3, and the overcoat layer 4*b* is provided after the trimming groove is formed in the resistor 3.

The pair of lower surface electrodes 5 is formed by sputtering Ni—Cr, Ti—Ni, Cu, or Ni—Cu on the back surface of the large-sized substrate.

The pair of resin electrode layers 6 is formed by screen-printing synthetic resin (for example, epoxy resin or phenolic resin) paste containing conductive particles such as Ag, Ni, or Cu on the lower surface electrodes 5 and then heating and curing the paste. The lower surface electrodes 5 and the resin electrode layers 6 are formed to have a laminate structure, excluding portions of the lower surface electrodes 5, and the portions of the lower surface electrodes 5 (upper and lower end portions in FIG. 2) which are in contact with the long sides of the insulating substrate 1 are exposed portions 5*a* exposed from the resin electrode layers 6.

The pair of end face electrodes 7 is formed by sputtering Ni—Cr or the like, and electrically connects the upper surface electrodes 2 and the lower surface electrodes 5 which are spaced apart from each other with the end faces of the insulating substrate 1 interposed therebetween. Note that the end face electrodes 7 cover the surfaces of the upper surface electrodes 2 located near the end faces of the insulating substrate 1 while making the surfaces of the upper surface electrodes 2 other than those above and the overcoat layer 4*b* exposed without covering them. Furthermore, the end face electrodes 7 cover the exposed portions 5*a* of the lower surface electrodes 5 and portions of the resin electrode layers 6, which are located near the end faces of the insulating substrate 1, while making the exposed portions 5*a* other than those described above and the surfaces of the resin electrode layers 6 other than those described above exposed.

Each of the pair of external electrodes 8 is formed to have a double layer structure including an inner barrier layer 8*a* and an outer external connection layer 8*b*, and the barrier layer 8*a* is an Ni plating layer formed by electroplating and the external connection layer 8*b* is an Sn plating layer formed by electroplating. The external electrodes 8 are formed so as to cover the entire surfaces of the end face electrodes 7, the surfaces of the upper surface electrodes 2 exposed from the end face electrodes 7, and the exposed portions 5*a* of the lower surface electrodes 5 and the resin electrode layers 6 which are exposed from the end face electrodes 7.

Next, the processes of producing the chip resistor 10 having the structure as described above will be described with reference to FIG. 3 to FIG. 5. FIG. 3 and FIG. 4 are cross-sectional views illustrating the production processes of the chip resistor 10, and FIG. 5 illustrates a flowchart of the production processes of the chip resistor 10.

Firstly, as illustrated in step S1 of FIG. 3(*a*) and FIG. 5, a large-sized substrate 1A having the shape of a sheet, from which a plurality of insulating substrates 1 is obtained is prepared. The large-sized substrate 1A is provided with primary division grooves and secondary division grooves which extend in a grid pattern, and each of the squares partitioned by these division grooves serves as one chip-forming area. FIG. 3 and FIG. 4 illustrate the cross-sections of one chip-forming area, however, practically, processes described below are carried out collectively for the large-sized substrate corresponding to a plurality of chip-forming areas.

That is, in step S2 of FIG. 5, as illustrated in FIG. 3(*b*), for forming, on the upper surface of the large-sized substrate 1A, the upper surface electrodes 2 facing each other across the chip-forming areas, the Ag—Pd paste is screen-printed in an area sandwiched between the secondary division grooves on the upper surface of the large-sized substrate 1A so as to extend across each of the primary division grooves and then dried and sintered.

Next, in step S3 of FIG. 5, as illustrated in FIG. 3(*c*), for forming the resistor 3 that extends across the pair of upper surface electrodes 2, the resistor paste such as ruthenium oxide is screen-printed on the upper surface of the large-sized substrate 1A and then dried and sintered.

Next, in step S4 of FIG. 5, as illustrated in FIG. 3(*d*), for forming the undercoat layer 4*a* that covers the resistor 3, the glass paste is screen-printed and then dried and sintered. Then, a trimming groove (not illustrated) is formed in the resistor 3 from above the undercoat layer 4*a* to adjust the resistance value.

Next, in step S6 of FIG. 5, as illustrated in FIG. 3(*e*), for forming the overcoat layer 4*b* that covers portions of the upper surface electrodes 2 and the entire of the resistor 3, the epoxy resin paste is screen-printed from above the undercoat layer 4*a* and then heated and cured. These undercoat layer 4*a* and overcoat layer 4*b* form the double layered protective layer 4 for covering the resistor 3.

Next, in step S6 of FIG. 5, as illustrated in FIG. 4(*f*), for forming, in the central portion of each of the chip-forming areas on the back surface of the large-sized substrate 1A, a mask 9 having the shape of a band, the masking paste is screen-printed in the area sandwiched between the primary division grooves on the back surface of the large-sized substrate 1A so as to extend across each of the secondary division grooves and then dried.

Next, in step S7 of FIG. 5, as illustrated in FIG. 4(*g*), for forming, on each of the chip-forming areas on the back surface of the large-sized substrate 1A, the lower surface electrodes 5 facing each other with the primary division grooves interposed therebetween, metal particles such as an Ni alloy (Ni—Cr, Ti—Ni, Ni—Cu or the like) and Cu are applied by sputtering toward the back surface of the large-sized substrate 1A. Thus, forming the lower surface electrodes 5 as metal thin film layers provided on the large-sized substrate 1A by sputtering enhances the adhesion of the lower surface electrodes 5 to the large-sized substrate (insulating substrate) 1A.

Next, in step S8 of FIG. 5, the mask 9 is removed by ultrasonic cleaning. Thereafter, in step S9 of FIG. 5, as illustrated in FIG. 4(*h*), forming the resin electrode layers 6 overlapping the lower surface electrodes 5, the epoxy resin paste or phenolic resin paste is screen-printed from above the lower surface electrodes 5 and then heated and cured (baked). At this time, forming the resin electrode layers 6 a little smaller in size than the lower surface electrodes 5 causes the exposed portions 5*a* exposed from the resin electrode layers 6 to be formed at both end portions of the lower surface electrodes 5 which are closer to the secondary division grooves (see FIG. 2).

The processes described above are carried out collectively for the large-sized substrate 1A. In the next process, the large-sized substrate 1A is divided by primary breaking (primary division) along the primary division grooves to obtain a strip-shaped substrate 1B.

Thereafter, in step S10 of FIG. 5, as illustrated in FIG. 4(*i*), for forming, on both end faces of the strip-shaped substrate 1B, the end face electrodes 7 that electrically connect between the upper surface electrodes 2 and the lower surface electrodes 5, Ni—Cr is applied on the divided faces of the strip-shaped substrate 1B by sputtering. The end face electrodes 7 cover portions of the surfaces of the upper surface electrodes 2 which are located closer to the divided faces of the strip-shaped substrate 1B, the exposed portions 5*a* of the lower surface electrodes 5 and portions of the surfaces of the resin electrode layers 6 which are located closer to the divided faces of the strip-shaped substrate 1B, respectively.

Next, the strip-shaped substrate 1B is divided by secondary breaking (secondary division) along the secondary division grooves to obtain a single chip 10C having the size equivalent to that of the chip resistor 10.

Next, in step S11 of FIG. 5, the single chip 1C which has been obtained by division into each piece is electroplated to form the barrier layers 8*a* for covering the upper surface electrodes 2, the end face electrodes 7, the resin electrode layers 6, and the exposed portions 5*a* of the lower surface electrodes 5. At this time, the lower surface electrodes 5 made of metal thin film layers having the low electrical resistivity have been formed on the back surface (mounting surface of the insulating substrate 1) of the single chip 1C and also the resin electrode layers 6 having the electrical resistivity higher than that of the metal thin film layers have been formed with portions of the lower surface electrodes 5 exposed, and thus this stabilizes the current flowing through the resin electrode layers 6 in the process of forming the external electrodes 8 by electroplating and thus makes the thickness of the plating films of the barrier layers 8*a* uniform. Furthermore, the plating layers are formed starting from the exposed portions 5*a* of the lower surface electrodes 5 having the low electrical resistivity toward the resin electrode layers 6 having the high electrical resistivity, which enables the barrier layers 8*a* to be formed on the resin electrode layers 6 with the high peel strength being maintained.

Thereafter, the single chip 1C is electroplated with Sn to form the external connection layers 8*b* for covering the entire surfaces of the barrier layers 8*a*, whereby, as illustrated in FIG. 4(*j*), the external electrodes 8 each having a double layer structure of the barrier layer 8*a* and the external connection layer 8*b* are formed. At this point, the chip resistor 10 as illustrated in FIG. 1 and FIG. 2 is obtained.

The chip resistor 10 thus produced as illustrated in FIG. 5 is mounted on lands 101 of the circuit board 100 with the mounting surface of the insulating substrate 1 (back surface) facing downward, and is surface-mounted on the circuit board 100 by bounding the pair of external electrodes 8 to the corresponding lands 101 via solder 102, respectively.

Exposure of the chip resistor 10 to the thermal shock during the surface mounting described above causes the thermal stress due to the difference between the coefficient of thermal expansion of the circuit board 100 and that of the insulating substrate 1 of the chip resistor 10, and the thermal stress acting on the solder joint portions may cause cracks to form. However, in the chip resistor 10 according to the present embodiment, the resin electrode layers 6 made of synthetic resin materials are laminated on the lower surface electrodes 5 to prevent the resin electrode layers 6 from easily peeling off. This enables the resin electrode layers 6 to relax the thermal stress, and thus can prevent formation of cracks.

As described above, in the chip resistor 10 according to the first embodiment, the lower surface electrodes 5 made of metal thin film layers having the low electrical resistivity have been formed on the mounting surface of the insulating substrate 1 and also the resin electrode layers 6 having the electrical resistivity higher than that of the metal thin film layers have been formed with portions of the lower surface electrodes 5 being exposed, and this stabilizes the current flowing through the resin electrode layers 6 in the process of forming the external electrodes 8 by electroplating and thus makes the thickness of the plating films uniform. In this process, the current can flow uniformly over the entire surfaces of the resin electrode layers 6 due to the laminate structure in which the resin electrode layers 6 partially overlap the portions excluding the exposed portions 5*a* of the lower surface electrodes 5 instead of connecting the lower surface electrodes 5 made of metal thin film layers only to the outer peripheries of the resin electrode layers 6. Furthermore, the plating layers are formed starting from the exposed portions 5*a* of the lower surface electrodes 5 having the low electrical resistivity toward the resin electrode layers 6 having the high electrical resistivity, which can prevent the plating layers formed on the resin electrode layers 6 from peeling off.

Thus, even when the strength of adhesion at the interfaces between the lower surface electrodes 5 formed of the metal thin film layers and the resin electrode layer 6 formed of the synthetic resin materials is low, due to the sandwich structure of the resin electrode layers 6 sandwiched between the metal thin film layers (lower surface electrodes 5) and the plating materials (external electrodes 8), the resin electrode layers 6 can be prevented from peeling off even in the chip resistor 10 after being finished, and the thermal stress caused by the thermal shock can be reliably relaxed. Furthermore, the lower surface electrodes 5 formed of the metal thin film layers having the high thermal conductivity are directly in contact with the insulating substrate 1, which causes, in the chip resistor 10 mounted on the circuit board 100, the heat generated in the resistor 3 to be radiated from the insulating substrate 1 to the circuit board 100 side through the lower surface electrodes 5 and the solder joint portions. This can realize the chip resistor 10 excellent in heat dissipation.

Furthermore, in the processes of producing the chip resistor 10, according to the procedures of forming the lower surface electrodes 5 by sputtering with the mask 9 being formed on the mounting surface of the insulating substrate 1, and then after removing the mask 9 using ultrasonic cleaning, forming the resin electrode layers 6 on the lower surface electrodes 5, the ultrasonic cleaning in removing the mask 9 does not adversely affect the resin electrode layers 6. Thus, the chip resistor 10 having high thermal shock resistance can be easily produced.

FIG. 7 is a cross-sectional view of a chip resistor 20 according to a second embodiment, and FIG. 8 is a rear view of the chip resistor 20 according to the second embodiment. The portions corresponding to those in FIG. 1 and FIG. 2 are provided with the same reference signs, and repetitive explanation therefor will be omitted.

The chip resistor 20 according to the second embodiment is different from the chip resistor 10 according to the first embodiment in that the exposed portions 5*a* of the lower surface electrodes 5 are formed closer to the central portions of the insulating substrate 1 which are farthest from the short sides thereof, while the structure other than the above is basically the same. That is, each of the pair of resin electrode layers 6 is formed so as to cover the entire surface of the lower surface electrode 5 having a rectangular shape, except the one side thereof which is close to the central portion, and the pair of lower surface electrodes 5 is formed on the mounting surface of the insulating substrate 1 with the exposed portions 5*a* thereof facing each other.

In the chip resistor 20 having the structure described above, the positions and shapes of the exposed portions 5*a* of the lower surface electrodes 5 which are exposed from the resin electrode layers 6 are different from those of the first embodiment, however, the same advantageous effects as those of the first embodiment can be obtained.

FIG. 9 is a rear view of a chip resistor 30 according to a third embodiment, in which the end face electrodes 7 and external electrodes 8 are not illustrated for convenience.

In the chip resistor 30 according to the third embodiment, each of the pair of lower surface electrodes 5 is exposed from the three sides of the resin electrode layer 6, except the one side closer to the short side of the insulating substrate 1, and each of the exposed portions 5*a* of the lower surface electrodes 5 is formed into a channel shape (C-shape) so as to surround the outer periphery of the resin electrode layer 6. In this structure, as compared with the cases of the first embodiment and second embodiment, the exposed portions 5*a* of the lower surface electrodes 5 exposed from the resin electrode layers 6 increase, which results in great improvement in heat dissipation and allows the plating layers to be formed stably.

FIG. 10 is a rear view of a chip resistor 40 according to a fourth embodiment, in which the end face electrodes 7 and external electrodes 8 are not illustrated for convenience.

In the chip resistor 40 according to the fourth embodiment, each of the resin electrode layers 6 is provided with a cutout portion 6*a* that opens toward the end face side of the insulating substrate 1, and each of the exposed portions 5*a* of the lower surface electrodes 5 is formed on the outer peripheral side of the resin electrode layer 6 and in the cutout portion 6*a*, respectively. In this structure, as compared with the case of the third embodiment, the exposed portions 5*a* of the lower surface electrodes 5 exposed from the resin electrode layers 6 increase, which allows the plating layers to be formed stably. Furthermore, providing the cutout portions 6*a* reduces the areas of the resin electrode layers 6 which are in contact with the primary division groove, which improves the breaking in primary-dividing the large-sized substrate 1A into the strip-shaped substrates 1B along the primary division grooves.

FIG. 11 is a rear view of a chip resistor 50 according to a fifth embodiment, in which the end face electrodes 7 and external electrodes 8 are not illustrated for convenience.

In the chip resistor 50 according to the fifth embodiment, each of the resin electrode layers 6 is formed at an inner position away from the end face of the insulating substrate 1, and each of the exposed portions 5*a* of the lower surface electrode 5 is formed into a frame shape so as to surround the entire periphery of the resin electrode layer 6. This structure allows the plating layers to be formed stably and also can improve the breaking in primary-division. Furthermore, applying metal particles such as Ni—Cr toward the divided faces of the strip-shaped substrate 1B by sputtering to form the end face electrodes 7 causes the sputtered particles to be formed on the exposed portions 5*a* of the lower surface electrodes 5 extending along the divided faces, and this enables the conductivity of the lower surface electrodes 5 and end face electrodes 7 to be stabilized.

The present invention is not limited to the embodiments described above, and various modifications can be made without departing from the concept of the present invention. The present invention covers all of the technical matters included in the technical ideas described in the claims. The embodiments described above are suitable examples, and those skilled in the art can realize various alternative examples, modifications, variations, and the like based on the contents disclosed herein, and these are included in the technical scope described in the claims.

For example, each of the exposed portions 5*a* of the lower surface electrodes 5 may be formed only at a position in contact with one long side of the insulating substrate 1, or each of the resin electrode layers 6 may be provided with a cutout portion which opens toward the side opposite to the end face of the insulating substrate 1 so that the pair of lower surface electrodes 5 is formed to have the shape reversed left and right with respect to the one illustrated in FIG. 10.

REFERENCE SIGNS LIST

1 insulating substrate
1A large-sized substrate
1B strip-shaped substrate
1C single chip
2 upper surface electrode
3 resistor
4 protective layer
4*a* undercoat layer
4*b* overcoat layer
5 lower surface electrode
5*a* exposed portion
6 resin electrode layer
6*a* cutout portion
7 end face electrode
8 external electrode
8*a* barrier layer
8*b* external connection layer
9 mask

100 circuit board
101 land
102 solder
10, 20, 30, 40, 50 chip resistor

The invention claimed is:

1. A chip resistor comprising:

a rectangular parallelepiped insulating substrate that includes a component surface and a mounting surface located on mutually opposite sides in a thickness direction;

a pair of upper surface electrodes that is provided at both ends, respectively, in a longitudinal direction on the component surface of the insulating substrate;

a resistor that bridges between the pair of upper surface electrodes;

a pair of lower surface electrodes that is provided at both ends, respectively, in the longitudinal direction on the mounting surface of the insulating substrate;

a pair of resin electrode layers that is laminated on the pair of lower surface electrodes, respectively, each of the pair of resin electrode layers being made of a synthetic resin material containing conductive particles;

a pair of end face electrodes that electrically connects the pair of upper surface electrodes and the pair of lower surface electrodes; and a pair of external electrodes that covers at least the pair of end face electrodes, each of the pair of external electrodes being made of a plating material, wherein the pair of lower surface electrodes is made of metal thin film layers formed as thin films on the mounting surface of the insulating substrate, respectively, and includes exposed portions exposed from the pair of resin electrode layers, respectively, and the pair of external electrodes is in contact with the exposed portions of the pair of lower surface electrodes and entire surfaces of the pair of resin electrode layers, respectively.

2. The chip resistor according to claim 1, wherein each of the exposed portions of the lower surface electrodes is formed into a channel shape so as to surround an outer periphery of each of the resin electrode layers.

3. The chip resistor according to claim 1, wherein each of the pair of resin electrode layers is provided with a cutout portion that opens toward an end face of the insulating substrate, and each of the exposed portions of the pair of lower surface electrodes is formed on an outer peripheral side of each of the resin electrode layers and in the cutout portion, respectively.

4. The chip resistor according to claim 1, wherein each of the resin electrode layers is formed at an inner position away from an end face of the insulating substrate, and each of the exposed portions of the pair of lower surface electrodes is formed into a frame shape so as to surround an entire periphery of each of the resin electrode layers.

5. The chip resistor according to claim 4, wherein each of the end face electrodes is formed of a metal thin film by sputtering metal particles toward the end face of the insulating substrate, and the metal thin film covers at least a portion of each of the exposed portions of the pair of lower surface electrodes.

6. A method of producing a chip resistor, comprising the steps of:

forming, on a component surface of an insulating substrate, a resistor and upper surface electrodes connected to both ends of the resistor, respectively;

forming, in a central portion of a mounting surface located on an opposite side of the component surface of the insulating substrate, a mask made of a soluble material;

forming, on the mounting surface exposed from the mask, lower surface electrodes by sputtering metal particles, respectively;

after removing the mask, forming resin electrode layers by printing synthetic resin materials containing conductive particles on the lower surface electrodes with portions of the lower surface electrodes being exposed, respectively;

forming end face electrodes that electrically connect between the upper surface electrodes and the lower surface electrodes by sputtering metal particles on end faces of the insulating substrate, respectively; and forming external electrodes that cover the end face electrodes, the exposed portions of the lower surface electrodes, and entire surfaces of the resin electrode layers by electroplating after forming the end face electrodes, respectively.

* * * * *